United States Patent [19]

Mosley

[11] Patent Number: 5,377,957
[45] Date of Patent: Jan. 3, 1995

[54] VEHICLE MOUNTED HYDRAULIC JACK SYSTEM

[76] Inventor: J. David Mosley, 7290 Columbus Rd., Lizella, Ga. 31052

[21] Appl. No.: 187,208

[22] Filed: Jan. 27, 1994

[51] Int. Cl.⁶ .............................................. B66F 3/24
[52] U.S. Cl. .............................................. 254/423
[58] Field of Search ............ 254/423, 419, 420, 93 R, 254/93 H

[56] References Cited

U.S. PATENT DOCUMENTS

| | | | |
|---|---|---|---|
| 2,964,118 | 12/1960 | Butterworth | 254/423 |
| 5,219,429 | 6/1993 | Shelton | 254/423 |
| 5,228,651 | 7/1993 | Warner | 254/44 |
| 5,232,206 | 8/1993 | Hunt et al. | 254/423 |

*Primary Examiner*—Robert C. Watson
*Attorney, Agent, or Firm*—Michael J. Colitz, Jr.

[57] ABSTRACT

A vehicle jack system attachable to a vehicle for lifting portions of the vehicle. The system includes at least one hydraulically operated jack pivotally mounted to the associated vehicle. A hydraulic positioning assembly extends between the jack and the vehicle to effect a pivoting of the jack into either a horizontal position for storage, or a vertical position for operation thereof. A solenoid arrangement facilitates a controlled distribution of hydraulic fluid from a pressure source to a plurality of such jacks mounted around the vehicle. An alternate embodiment of the present includes a ground engaging ski for permitting translation of the vehicle over a icy surface, and a locking assembly for securing both a longitudinal and angular position of each jack.

9 Claims, 4 Drawing Sheets

VEHICLE MOUNTED HYDRAULIC JACK SYSTEM

BACKGROUND OF THE INVENTION

1. Field of the Invention

The present invention relates to lifting jacks and more particularly pertains to a vehicle mounted hydraulic jack system attachable to a vehicle which may be utilized for lifting the vehicle.

2. Description of the Prior Art

The use of lifting jacks is known in the prior art. More specifically, lifting jacks heretofore devised and utilized for the purpose of raising a vehicle are known to consist basically of familiar, expected and obvious structural configurations, notwithstanding the myriad of designs encompassed by the crowded prior art which have been developed for the fulfillment of countless objectives and requirements.

For example a built in power jack is illustrated in U.S. Pat. No. 4,993,688 which may be easily attached to all currently manufactured automobiles chassis and frames. The apparatus includes a front suspension pneumatic jack that is mounted centrally to the front suspension of an automobile between its front wheels, and a rear suspension pneumatic jack that is mounted centrally to the rear suspension of the automobile between its rear wheels. The system operates from a compressed air reservoir tank that has connections for the front and the rear car Jack outlets, and addition outlets can be added to the compressed air reservoir tank for connecting a pneumatic lug wrench or tire inflating hose.

An electrically operated retractable jack is disclosed in U.S. Pat. No. 4,067,543 which is particularly suited for leveling a vehicle such as a recreational vehicle. The jack is automatically retractable from a vertical position into a horizontal storage position under the vehicle. The jack may be operated individually or a plurality of jacks may used in leveling the corners of the vehicle. The jacks may be raised and lowered by control switches mounted inside the vehicle without the need of the operator getting outside the vehicle.

Another patent of interest is U.S. Pat. No. 3,984,082 which discloses a self-stowing jack in which a pair of elongated axially telescoping members are arranged to be driven lengthwise relative to each other to lift the associated vehicle to which they are attached, and when retracted, to move into a self-stowing position. The telescoping members are pivoted at one end to the vehicle to be lifted or leveled, and automatic latches are arranged for latching the telescoping jack members in both the stowed and lifting positions.

While these devices fulfill their respective, particular objectives and requirements, the aforementioned patents do not disclose a vehicle jack system attachable to a vehicle for lifting the vehicle which includes at least one hydraulically operated jack and a hydraulic positioning assembly that extends between the jack the vehicle to effect a pivoting of the jack into either a horizontal position for storage, or a vertical position for operation thereof. Furthermore, none of the known prior art lifting jacks teach or suggest a vehicle mounted hydraulic jack system which includes the aforementioned structure and which further includes both a ground engaging ski for permitting the translation of the vehicle over icy surface, and a locking assembly for securing both a longitudinal and angular position of each jack.

In these respects, the vehicle mounted hydraulic jack system according to the present invention substantially departs from the conventional concepts and designs of the prior art, and in so doing provides an apparatus primarily developed for the purpose of selectively lifting corners of an associated vehicle.

SUMMARY OF THE INVENTION

In view of the foregoing disadvantages inherent in the known types of lifting jacks now present in the prior art, the present invention provides a new vehicle mounted hydraulic jack system construction wherein the same can be utilized for selectively lifting corners of an associated vehicle. As such, the general purpose of the present invention, which will be described subsequently in greater detail, is to provide a new vehicle mounted hydraulic jack system apparatus which has many of the advantages of the lifting jacks mentioned heretofore and many novel features that result in a vehicle mounted hydraulic Jack system which is not anticipated, rendered obvious, suggested, or even implied by any of the prior art lifting jacks, either alone or in any combination thereof.

To attain this, the present invention generally comprises a vehicle jack system attachable to a vehicle for lifting portions of the vehicle. The system includes at least one hydraulically operated jack pivotally mounted to the associated vehicle. A hydraulic positioning assembly extends between the jack and the vehicle to effect a pivoting of the jack into either a horizontal position for storage, or a vertical position for operation thereof. A solenoid arrangement facilitates a controlled distribution of hydraulic fluid from a pressure source to a plurality of such jacks mounted around the vehicle. An alternate embodiment of the present includes a ground engaging ski for permitting translation of the vehicle over a icy surface, and a locking assembly for securing both a longitudinal and angular position of each jack.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mounted hydraulic jack system apparatus which has many of the advantages of the lifting jacks mentioned heretofore and many novel features that result in a vehicle mounted hydraulic jack system which is not anticipated, rendered obvious, suggested, or even implied by any of the prior art lifting jacks, either alone or in any combination thereof.

It is another object of the present invention to provide a new vehicle mounted hydraulic jack system which may be easily and efficiently manufactured and marketed.

It is a further object of the present invention to provide a new vehicle mounted hydraulic jack system which is of a durable and reliable construction.

An even further object of the present invention is to provide a new vehicle mounted hydraulic jack system which is susceptible of a low cost of manufacture with regard to both materials and labor, and which accordingly is then susceptible of low prices of sale to the consuming public, thereby making such vehicle mounted hydraulic jack systems economically available to the buying public.

Still yet another object of the present invention is to provide a new vehicle mounted hydraulic jack system which provides in the apparatuses and methods of the prior art some of the advantages thereof, while simultaneously overcoming some of the disadvantages normally associated therewith.

Still another object of the present invention is to provide a new vehicle mounted hydraulic jack system attachable to a vehicle for lifting the corners of the associated vehicle.

Yet another object of the present invention is to provide a new vehicle mounted hydraulic jack system which includes at least one hydraulically operated jack pivotally mountable to the associated vehicle and a hydraulic positioning assembly extending between the jack and the vehicle to effect a pivoting of the jack into either a horizontal position for storage, or vertical position for operation thereof.

Even still another object of the present invention is to provide a new vehicle mounted hydraulic jack system which further includes a ground engaging ski for permitting translation of the vehicle over an icy surface.

Even still yet another object of the present invention is provide a new vehicle mounted hydraulic jack system which even further includes a locking assembly for securing both a longitudinal and angular position of each jack.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
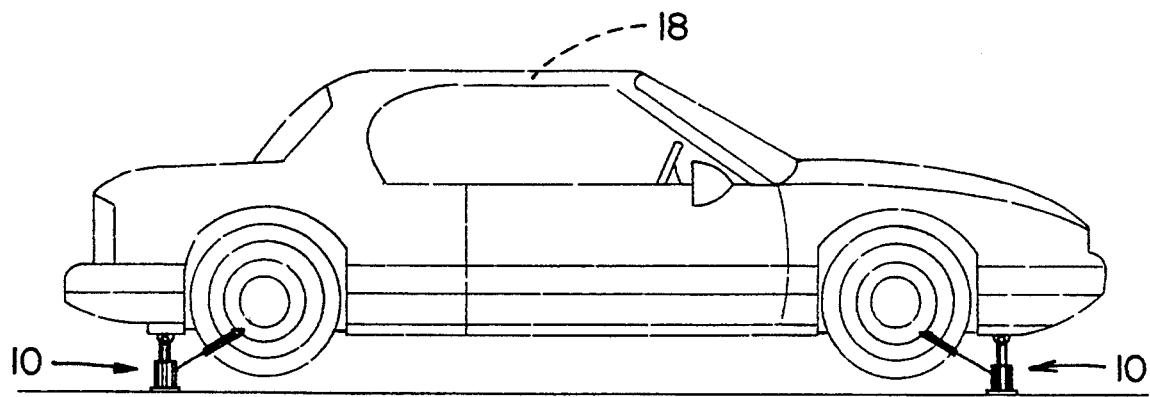
FIG. 1 is a side elevation view of plurality of vehicle mounted hydraulic jacks comprising a first embodiment of the present invention, as installed on a vehicle.

With reference now to the drawings, and in particular to FIGS. 1-6 thereof, a first embodiment of a new vehicle mounted hydraulic jack system embodying the principles and concepts of the present invention and generally designated by the reference numeral 10 will be described.

Figure 2:
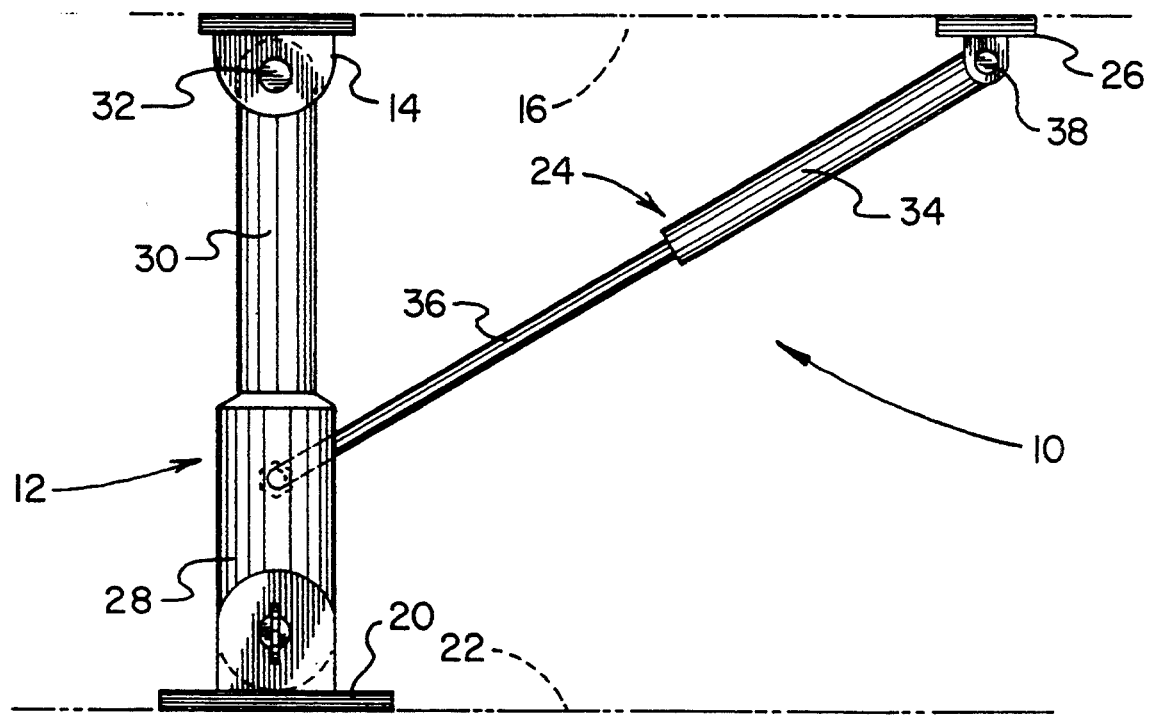
FIG. 2 is a side elevation view of one of such jacks.
Figure 4:
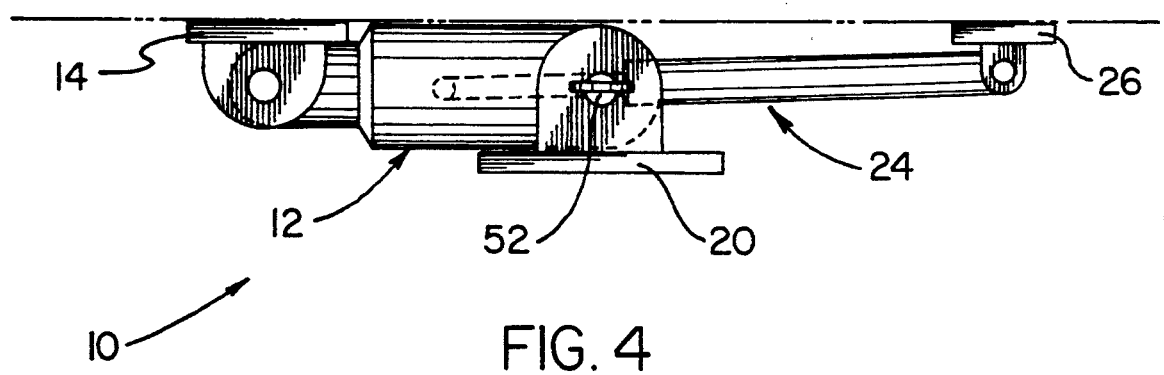
FIG. 4 is a side elevation view of the first embodiment in a storage position.

From an overview standpoint, the vehicle mounted hydraulic jack system 10 comprises a hydraulic jack 12 which is pivotally coupled to a first mounting hinge 14 that may be secured to a frame rail 16 of an associated vehicle 18, as best illustrated in FIG. 2. The first mounting hinge 14 allows the jack 12 to be positioned into either a horizontal position for storage, or a vertical position for operation thereof. The jack 12 is provided with a ground engaging base 20 which may be adjusted to various angles relative to the jack to accommodate placement upon an uneven ground surface 22, as shown in FIG. 2, or to facilitate storage of the jack 12, as illustrated in FIG. 4.

A hydraulically operated positioning assembly 24 is pivotally coupled to a second mounting hinge 26 which may also be secured to the frame rail 16 of the vehicle 18 in a spaced relationship to the first mounting hinge 14. The positioning assembly 24 extends from the second mounting hinge to the jack 12 and is operable to selectively pivot the jack into either the horizontal storage position or the vertical operational position.

In use, the vehicle mounted hydraulic jack system 10 may be installed onto a vehicle 18 by mounting a plurality of the hydraulic Jacks 12 to selected portions of the vehicle. Preferably, four of such jacks 12 are used, with each jack being mounted proximate a corner of the vehicle 18. Such arrangement allows the vehicle 18 to be selectively leveled, elevated for service, or otherwise lifted off the ground at any time. The vehicle mounted hydraulic jack system 10 eliminates the need for a portable jack to be carried in the trunk, and allows for more convenient servicing of the vehicle, such as encountered when replacing a flat tire, removing debris from underneath the vehicle 18, changing the oil, and other similar activities which require an elevation of the vehicle.

More specifically, it will be noted that the vehicle mounted hydraulic jack system 10 comprises a jack 12 including a first outer cylinder 28 which is substantially fluid tight and telescopically receives a first inner rod 30 operable to be hydraulically extended and retracted into the first outer cylinder, as best illustrated in FIG. 2. Although not specifically illustrated, suitable hydraulic fluid lines are connectable to the jack 12 and are operable to supply hydraulic fluid from a pressurized fluid source which will hereinafter be described in detail.

The jack 12 is pivotally mounted to a vehicle 18 by a first mounting hinge 14 which may be bolted, welded, or otherwise secured to a frame rail 16 of the vehicle. Specifically, the first inner rod forming a part of the jack 12 is pivotally coupled to the first mounting hinge 14 by a first pivot pin 32 which extends through appropriately positioned apertures in both the first mounting hinge and the first inner rod. By this structure, the jack 12 may be pivoted relative to the frame rail 16 of the vehicle 18 into either a horizontal position for storage, or a vertical position for operation thereof.

To effect movement of the jack 12 into either of the two positions, a positioning assembly 24 is pivotally mounted between the frame rail 16 and the jack 12, as best illustrated in FIG. 2. A second mounting hinge 26 is bolted, welded, or otherwise fixedly secured to the frame rail 16 in a spaced relationship to the first mounting hinge 14. The positioning assembly 24 includes a substantially fluid tight second outer cylinder 34 into which a second inner rod 36 is slidably, telescopically received. The second outer cylinder 34 is pivotally mounted to the second mounting hinge 26 by a second pivot pin 38 which extends through appropriately positioned apertures in both the second mounting hinge and the second outer cylinder.

Figure 3:
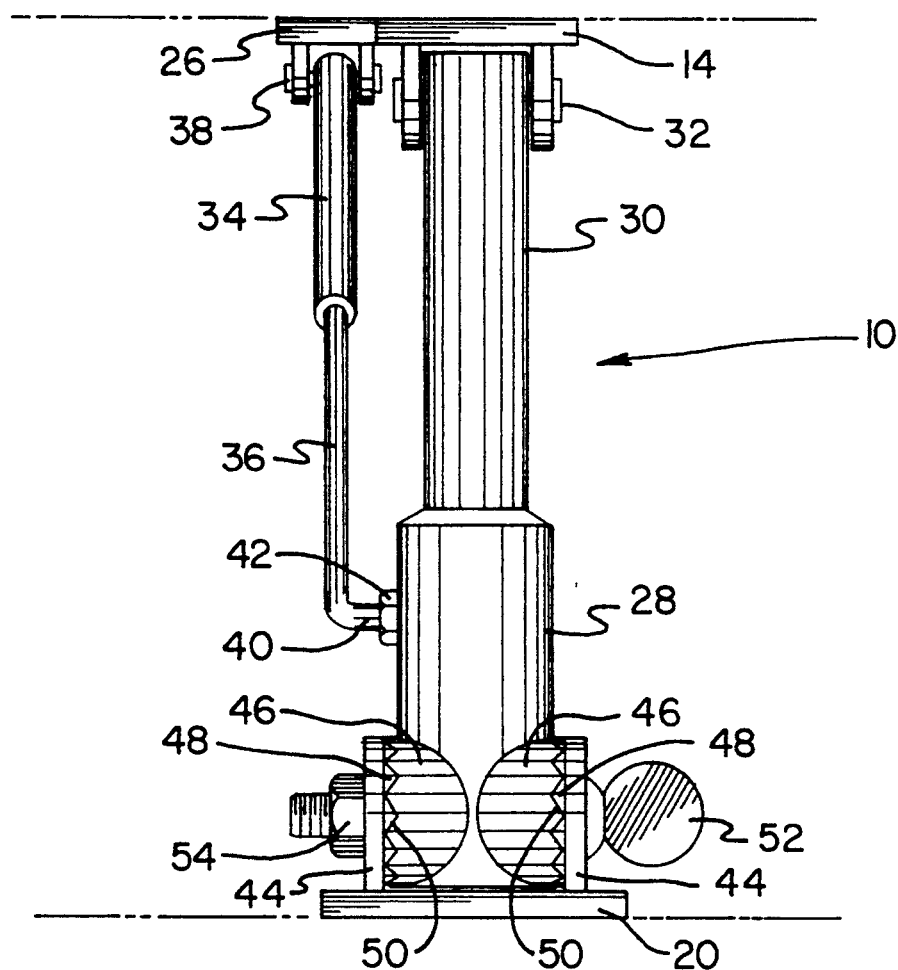
FIG. 3 is a rear elevation view of the first embodiment.

In addition, the second inner rod 36 is pivotally mounted to the first outer cylinder 28 forming a portion of the jack 12, as best illustrated in FIG. 3. Specifically, the second inner rod 36 includes an orthogonal portion 40 which is threadably or otherwise rotatably received within a threaded boss 42 which is coupled to the first outer cylinder 28 of the jack 12, as best illustrated in FIG. 3. The positioning assembly 24 is connectable to unillustrated to hydraulic fluid lines; which supply hydraulic fluid from a pressurized source to effect translation of the second inner rod 36 with respect to the second outer cylinder 34, thereby effecting a movement of the jack 12 into either the horizontal position as illustrated in FIG. 4, or the vertical operational position as illustrated in FIGS. 2 and 3.

As best illustrated in FIG. 3, the jack 12 is provided with a base 20 which is pivotally adjustable so as to both engage an uneven ground surface 22 and fold compactly for storage. The base 20 includes a pair of spaced plates 44 which allow the lower portion of the first outer cylinder 28 to be positioned therebetween. A pair of tangential members 46 are positioned on diametrically opposed surfaces of the lower portion of the first outer cylinder 28 and are operable to provide a surface against which the plates 44 may engage. The plates 44 each include a plurality of inwardly extending teeth 48 which are engagable to cooperatively positioned grooves 50 formed on each of the tangential members 46. By this structure, the base 20 maybe secured in any of a predetermined number of angular positions with respect to the jack 12, and secured thereto by a thumb screw 52 and a nut 54, as illustrated in FIG. 3. Although a specific locking structure has been illustrated for securing an angular relationship between the base 20 and the jack 12, it is within the intent and purview of the present invention to utilize any other conventionally known angular locking mechanism, as well as to simply allow the base to freely pivot with respect to the jack such that individual adjustment of the base is eliminated. In the case of a freely pivoted base 20, the base should be accordingly weighted such that a horizontal position of the base is maintained during storage and deployment of the jack 12 to ensure proper engagement with the ground surface.

Figure 5:
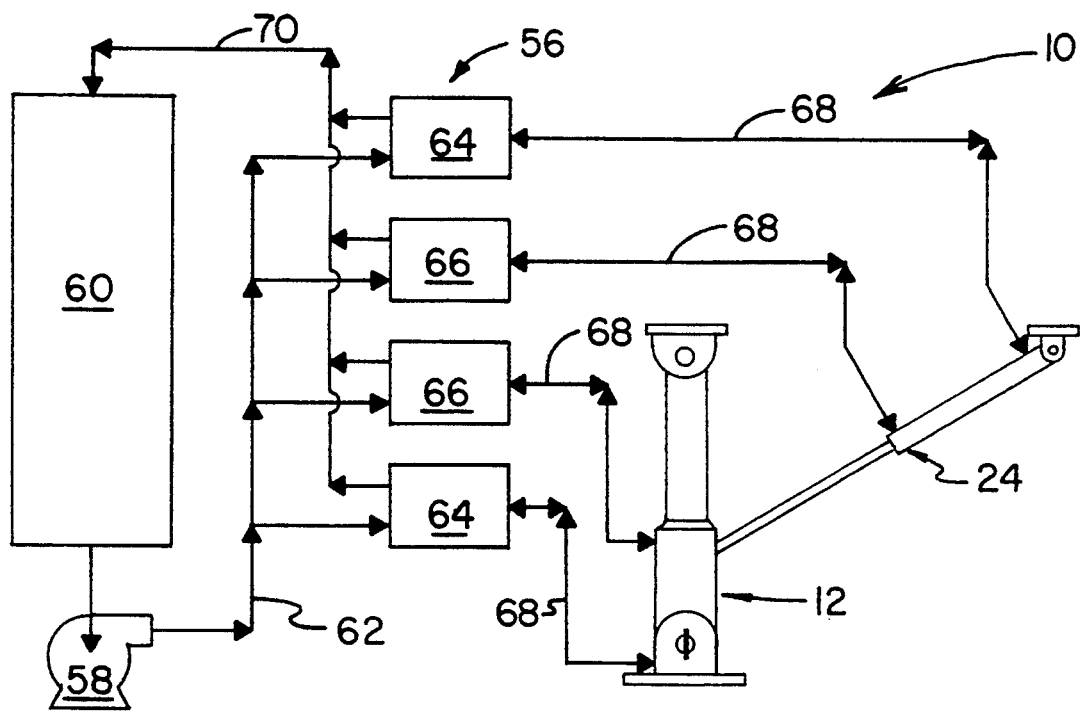
FIG. 5 is a diagrammatic illustration of the hydraulic fluid control system.

FIG. 5 is a diagrammatic illustration of a fluid control system 56 which may be utilized to selectively operate both the jack 12 and the positioning assembly 24. The fluid control system 56 includes a pump 58 which supplies hydraulic fluid from a fluid reservoir 60 to a high pressure line 62 connected to a plurality solenoids. Specifically, the solenoids include a pair of extend solenoids 64 and a pair of retract solenoids 66. The solenoids 64, 66 include valves which selectively couple either the high pressure line 62 to fluid lines 68 connected to the jack 12 and positioning assembly 24 or, alternately, couple the fluid lines 68 to a drain line 70. This arrangement allows hydraulic fluid from the high pressure lines 62 to be appropriately distributed into both the jack 12 and the positioning assembly 24, as well allowing excess fluid to be returned to the fluid reservoir 60 through the drain lines 70, thereby effecting either an extension or retraction of the jack 12 as describe above.

As an example of operation, the extend solenoids 64 may be actuated so as to connect the appropriate fluid lines 68 of the jack 12 and the positioning assembly 24 to the high pressure line 62. Simultaneously, the retract solenoids 66 couple the other fluid lines 68 to the drain line 70. Such cooperation between the solenoids 64, 66 facilitates a simultaneous operation of both the jack 12 and the positioning assembly 24.

Figure 6:
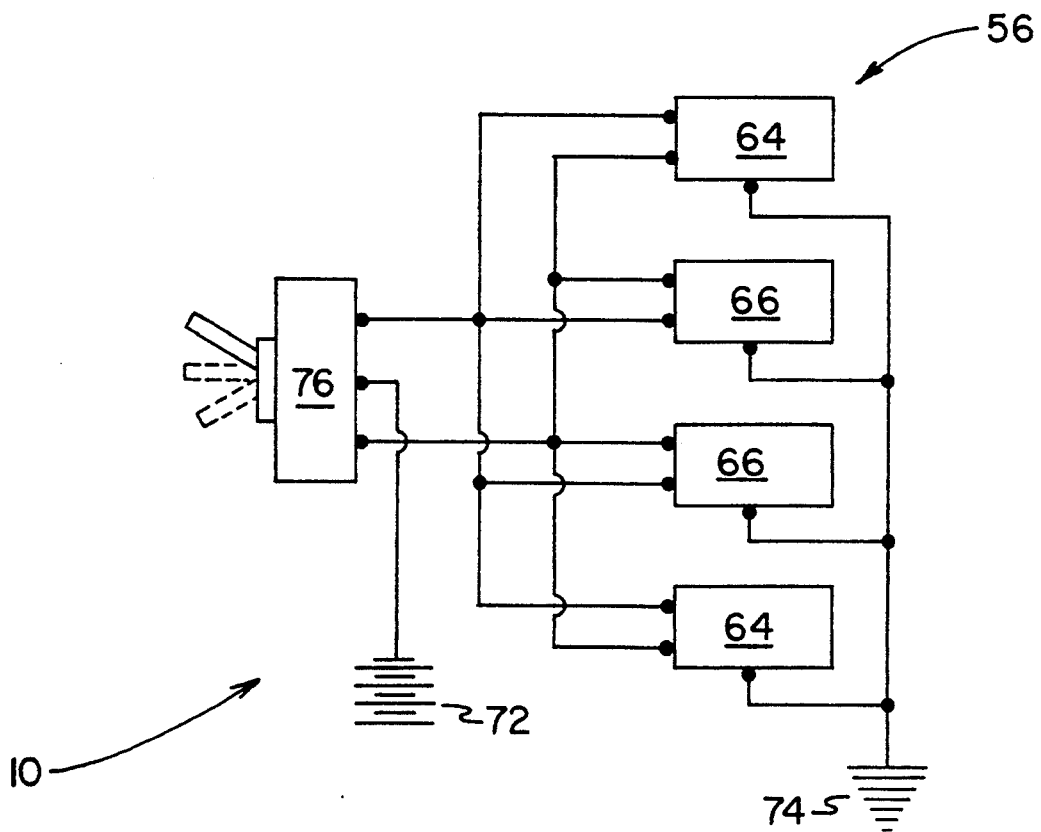
FIG. 6 is a further diagrammatic illustration of the electrical circuitry which operates the fluid control system.

FIG. 6 is a diagrammatic illustration of the electrical connections present between the solenoids 64, 66 and a power source such as a vehicle battery 72. It can be seen from this Figure that the solenoids 64, 66 are connected to a ground 74 and a three-position switch 76 by unlabeled wires which allow the extend solenoids 64 to simultaneously operate in cooperation with the retract solenoids 66. The three-position switch 76 allows a user to raise, lower, or hold-fast a position of the jack 12. Should more than one jack 12 be installed around a Vehicle 18, additional fluid control systems 56 should be provided. However, it is within the intent and purview of the present invention to couple more than one jack 12 to each fluid control system 56 to effect simultaneous operation thereof.

In use, the vehicle mounted hydraulic jack system 10 may be installed onto a vehicle 18 by mounting a plurality of the hydraulic jacks 12 to selected portions of the vehicle. Preferably, four of such jacks 12 are used, with each jack being mounted proximate a corner of the vehicle 18. Such arrangement allows the vehicle 18 to be selectively leveled, elevated for service, or otherwise lifted off the ground at any time. The vehicle mounted hydraulic jack system 10 eliminates the need for a portable jack to be carried in the trunk, and allows for more convenient servicing of the vehicle, such as encountered when replacing a flat tire, removing debris from underneath the vehicle 18, changing the oil, and other similar activities which require an elevation of the vehicle.

Figure 7:
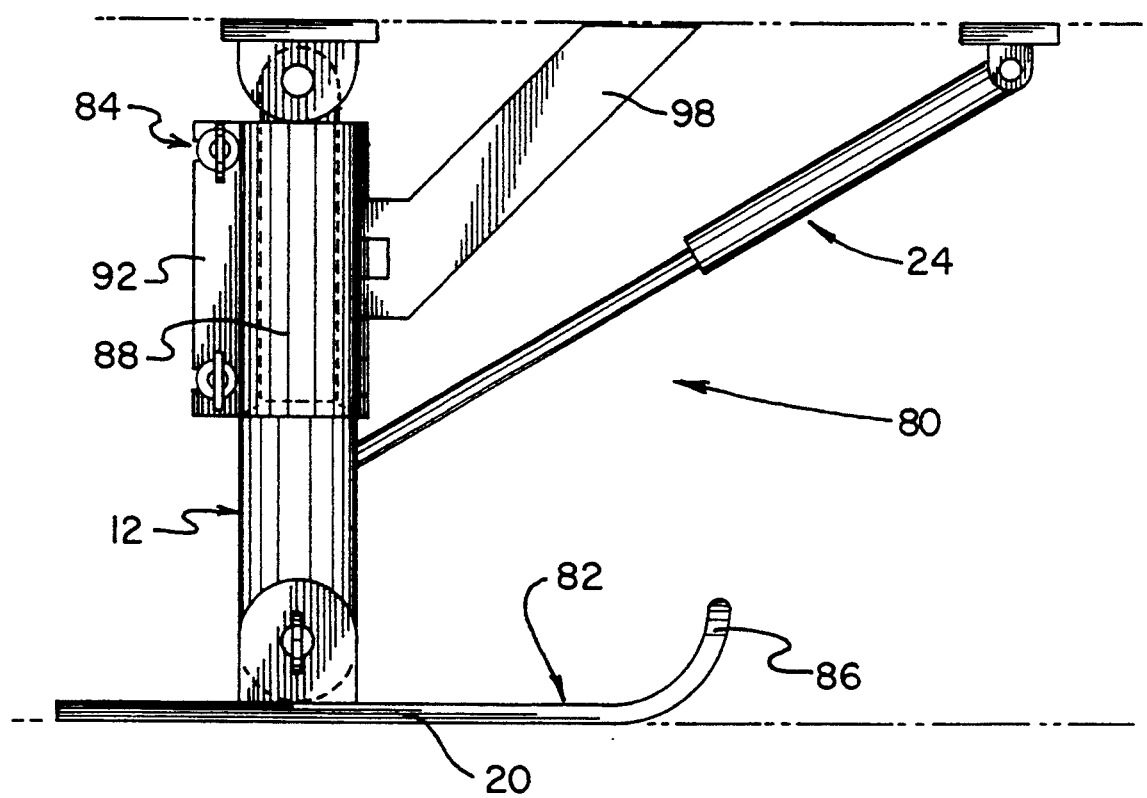
FIG. 7 is a side elevation view of a second embodiment of a vehicle mounted hydraulic jack system comprising the present invention.
Figure 8:
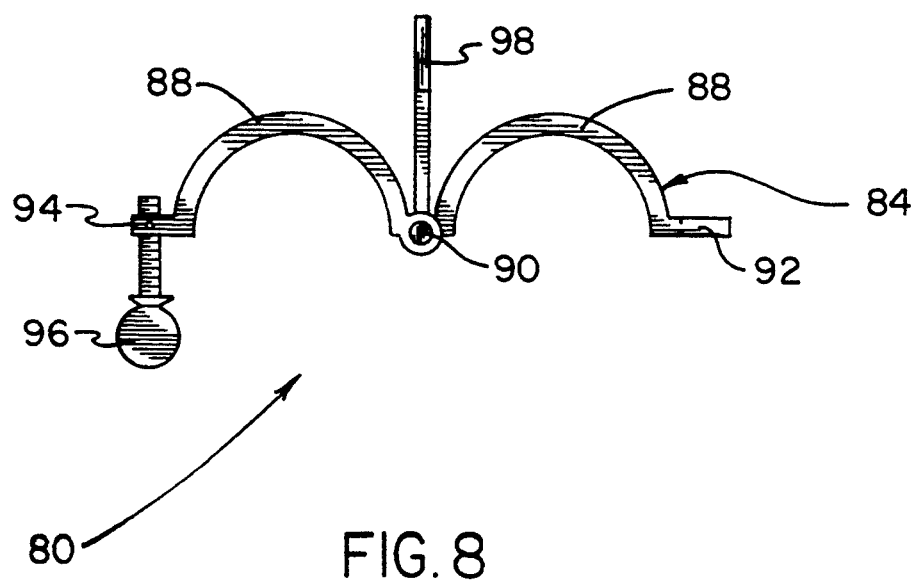
FIG. 8 is a top plan view of a portion of the second embodiment.

A second embodiment of the present invention, as generally designated by the reference numeral 80, which comprises substantially all of the features and structure of the foregoing embodiment 10 and which further comprises a ski 82 and a locking assembly 84 will now be described. As best shown in FIGS. 7–8, it can be shown that the base 20 includes an upturned portion 86 to form the ski 82. The ski 82 allows the vehicle 18 to translate over frozen or icy ground should a user so desire. Thus, should a tire or wheel of the vehicle become inoperative for any reason, the ski 82 allows the vehicle to advance over an icy surface, such as a frozen road.

Additionally or alternatively, the second embodiment 80 may be provide with a locking assembly 84 to effectively secure both a longitudinal and angular position of each of the jacks 12. The locking assembly 84 comprises a pair semi-circular members 88 which are pivotally coupled together by a hinge pin 90. One of the semi-circular members 88 is provided with an apertured flange 92 and the other semi-circular is provided with a threaded flange 94. The flanges 92, 94 extend substantially orthogonally away from the members 88 and are operable to be positioned against one another such that a screw 96 may couple the members 88 together. Specifically, the apertured flange 92 includes an unlabeled aperture which allows the screw 96 to be laterally positioned into the aperture, whereby a rotation of the screw will effect a clamping of the semi-circular members 88 together to substantially define a hollow cylinder. The locking assembly 84 is operable to be positioned over the first inner rod 30 forming a part of the jack 12, thereby precluding an accidental lowering of the jack.

To preclude angular movement of the jack 12, a reinforcing web 98 is pivotally coupled to the semi-circular members 88 by the hinge pin 90, as best illustrated in FIG. 7. The reinforcing web 98 extends outwardly and upwardly from the semi-circular members 88 to engage the frame rail 16 of the associated vehicle 18. The reinforcing web 98 is operable to effectively preclude a pivoting of the jack 12, thereby retaining the jack in the vertical or operational position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle mounted hydraulic jack comprising:

a hydraulically operated jack having upper and lower ends;

a substantially flat base pivotally mounted to said lower end of said jack, said base being weighted so as to maintain a substantially horizontal orientation;

a first mounting hinge pivotally mounted to said upper end of said jack, said mounting hinge being securable to a frame rail of a vehicle;

a hydraulically operated positioning assembly having first and second ends and being pivotally mounted to said jack at said first end thereof;

a second mounting hinge pivotally coupled to said second end of said positioning assembly, said mounting hinge being securable to said frame rail of said vehicle in a spaced relationship with respect to said first mounting hinge such that said positioning assembly may effect a pivoting of said jack;

a fluid control means for selectively, simultaneously supplying hydraulic fluid to both said jack and said positioning assembly, said control means comprising a fluid reservoir for receiving hydraulic fluid; a pump in fluid communication with said reservoir; a first pair of solenoids each in fluid communication with said pump, said fluid reservoir, and said jack; and a second pair of solenoids in fluid communication with said pump, said fluid reservoir, and said positioning assembly, said solenoids being electrically connectable to a power source and cooperatively operable to effect a pivoting of said jack, said first pair of solenoids including an extend solenoid and a retract solenoid, and said second pair of solenoids including an extend solenoid and a retract solenoid, said extend solenoids being electrically coupled together to effect simultaneous operation thereof, and said retract solenoids being electrically coupled together to effect simultaneous operation thereof;

a thumb screw; and, a nut, wherein said base includes a pair of spaced plates coupled to and extending substantially orthogonally from said base, said plates having a plurality of inwardly projecting teeth, and further wherein said jack includes a pair of tangential members positioned in a diametrically opposed relationship and secured to said lower end of said jack, said tangential members being positioned between said plates and including grooves operable to receive said teeth, said tangential members and said spaced plates each having an aperture through which said thumb screw can pass and engage said nut, thereby securing an angular position of said base with respect to said jack.

2. The vehicle mounted hydraulic jack of claim 1, wherein said base comprises a ski.

3. The vehicle mounted hydraulic jack of claim 1, and further comprising a locking assembly removably positioned upon said jack for securing both a longitudinal and angular position of said jack with respect to said vehicle.

4. The vehicle mounted hydraulic jack of claim 3, wherein said locking assembly comprises a pair of semicircular members pivotally coupled together; a reinforcing web pivotally coupled to said members and extending outwardly and upwardly therefrom; and a means for securely coupling said members together, whereby said locking assembly may be placed around a portion of said jack to preclude longitudinal motion thereof with said reinforcing web extending into contact with said frame to preclude an angular motion of said jack.

5. The vehicle mounted hydraulic jack of claim 4, wherein said base comprises a ski.

6. A vehicle mounted hydraulic jack comprising:
a hydraulically operated jack having upper and lower ends;
a substantially flat base pivotally mounted to said lower end of said jack, said base being weighted so as to maintain a substantially horizontal orientation;
a first mounting hinge pivotally mounted to said upper end of said jack, said mounting hinge being securable to a frame rail of a vehicle;
a hydraulically operated positioning assembly having first and second ends and being pivotally mounted to said jack at said first end thereof;
a second mounting hinge pivotally coupled to said second end of said positioning assembly, said mounting hinge being securable to said frame rail of said vehicle in a spaced relationship with respect to said first mounting hinge such that said positioning assembly may effect a pivoting of said jack; and,
a fluid control means for selectively, simultaneously supplying hydraulic fluid to both said jack and said positioning assembly, said control means comprising a fluid reservoir for receiving hydraulic fluid; a pump in fluid communication with said reservoir; a first pair of solenoids each in fluid communication with said pump, said fluid reservoir, and said jack; and a second pair of solenoids in fluid communication with said pump, said fluid reservoir, and said positioning assembly, said solenoids being electrically connectable to a power source and cooperatively operable to effect a pivoting of said jack, said first pair of solenoids including an extend solenoid and a retract solenoid, and said second pair of solenoids including an extend solenoid and a retract solenoid, said extend solenoids being electrically coupled together to effect simultaneous operation thereof, and said retract solenoids being electrically coupled together to effect simultaneous operation thereof.

7. The vehicle mounted hydraulic jack of claim 6, and further comprising a locking assembly removably positioned upon said jack for securing both a longitudinal and angular position of said jack with respect to said vehicle.

8. The vehicle mounted hydraulic jack of claim 7, wherein said locking assembly comprises a pair of semicircular members pivotally coupled together; a reinforcing web pivotally coupled to said members and extending outwardly and upwardly therefrom; and a means for securely coupling said members together, whereby said locking assembly may be placed around a portion of said jack to preclude longitudinal motion thereof with said reinforcing web extending into contact with said frame to preclude an angular motion of said jack.

9. The vehicle mounted hydraulic jack of claim 8, wherein said base comprises a ski.

* * * * *